United States Patent [19]
Cook

[11] 3,797,873
[45] Mar. 19, 1974

[54] ENERGY ABSORBING APPARATUS

[75] Inventor: Charles A. Cook, Jacksonville, Tex.

[73] Assignee: Ethyl Corporation, Richmond, Va.

[22] Filed: June 28, 1971

[21] Appl. No.: 157,114

[52] U.S. Cl.................. 293/63, 293/96, 188/1 C
[51] Int. Cl............................................ B60r 19/04
[58] Field of Search......... 188/1 C; 213/1 A; 293/1,
293/DIG. 3, 48, 49, 60, 63, 70, 83, 84, 89,
96, 98

[56] References Cited
UNITED STATES PATENTS
1,261,552  4/1918  Kingsbery............................ 293/48
2,751,995  6/1956  Kastory................................ 180/83
3,214,265  10/1965 Fiedler.................................. 75/20
3,506,295  4/1970  Yancey................................ 293/70
3,610,609  10/1971 Sobel................................. 267/140

Primary Examiner—Gerald M. Forlenza
Assistant Examiner—Robert Saifer
Attorney, Agent, or Firm—Donald L. Johnson; John F. Sieberth; David L. Ray

[57] ABSTRACT

An energy absorbing apparatus for a vehicle including a frame connected to the front end of an automobile chassis. The frame is connected to the vehicle bumper by compressible energy absorbing means.

13 Claims, 3 Drawing Figures 3,797,873

ENERGY ABSORBING APPARATUS

BACKGROUND OF THE INVENTION

Federal regulations have been proposed recently which will require an automobile, or other vehicle, to withstand various types of collisions at different speeds. Many types of energy absorbing devices have been proposed to lower the maximum deceleration which the occupants of an automobile undergo as the result of a collision. Piston-type hydraulic absorbers have been proposed for use between the front bumper of an automobile and the frame of the automobile to reduce the deceleration of the vehicle. Combinations of springs and shock absorbers have also been proposed to decrease the deceleration of a colliding automobile.

It is the object of the present invention to provide a novel apparatus for reducing the maximum deceleration undergone by a vehicle during a collision.

It is another object of the present invention to provide an energy absorbing apparatus which may be easily and economically adapted to a conventional automobile frame.

THE INVENTION

The foregoing and other objectives are realized in an energy absorbing apparatus for an automobile which includes load distribution means, compressible energy absorbing means connected to load distribution means, first frame means connected to the compressible energy absorbing means, and vehicle frame means connected to the first frame means.

The invention will be more fully understood by referring to the drawings in which.

Figure 1:
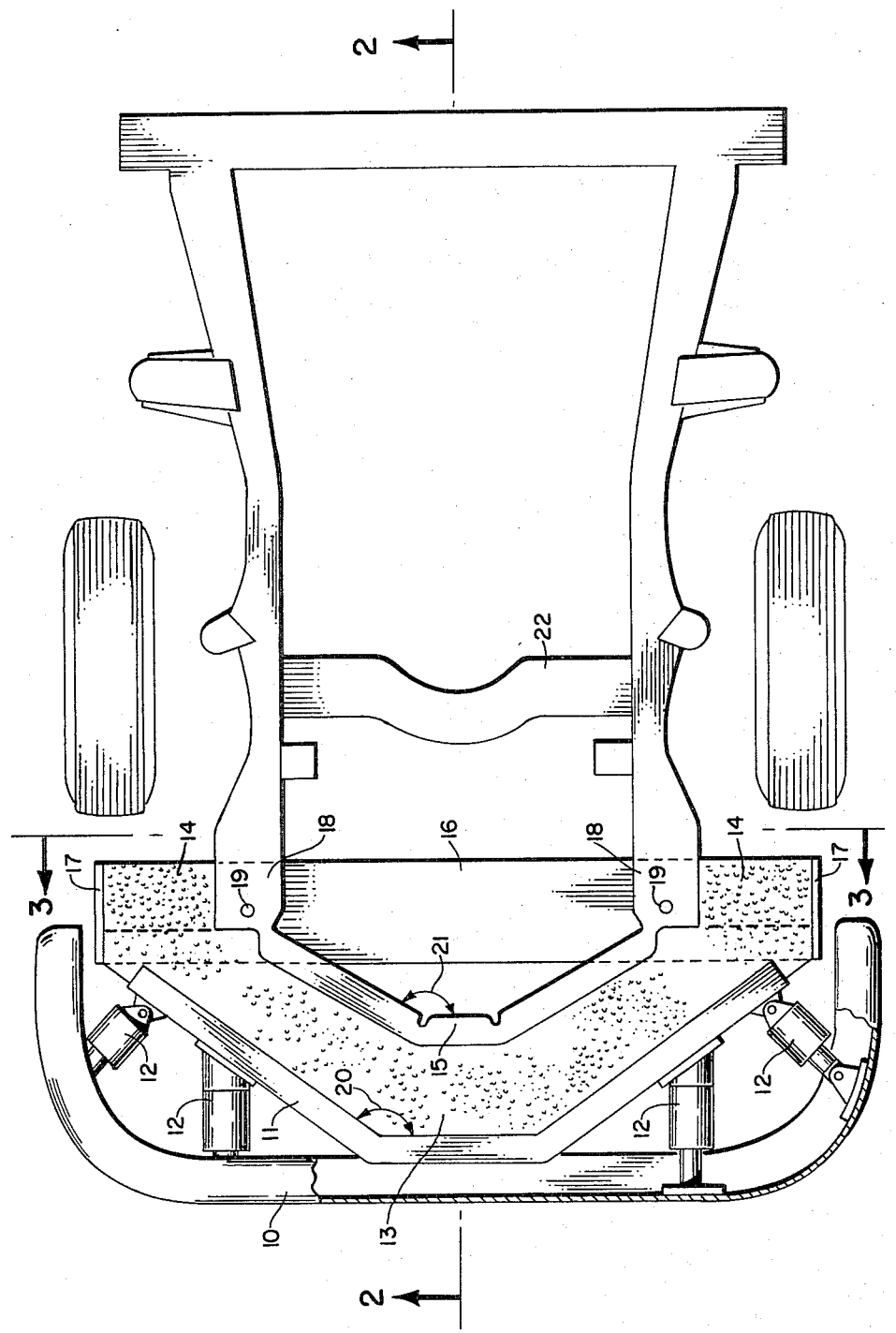
FIG. 1 is a partly sectional top view of the apparatus of the present invention connected to the front end of a vehicle frame.
Figure 2:
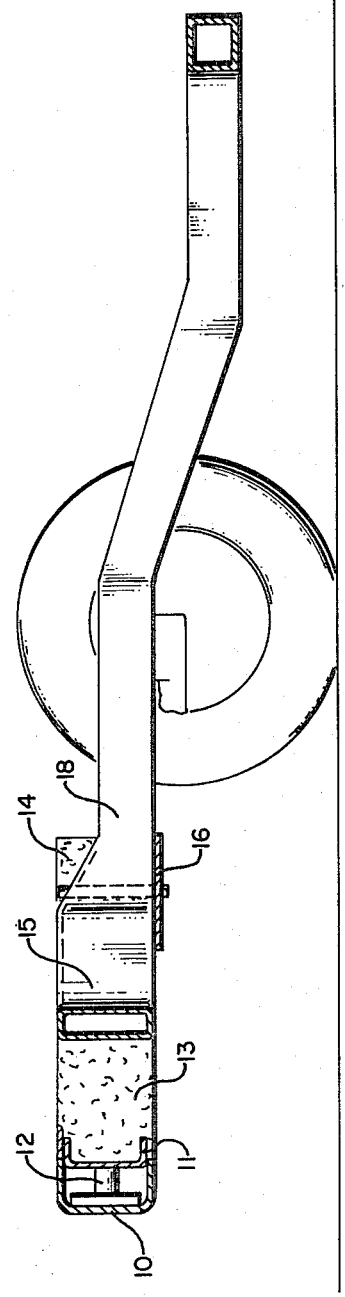
FIG. 2 is a partly sectional side view of FIG. 1 taken along lines 2—2.
Figure 3:
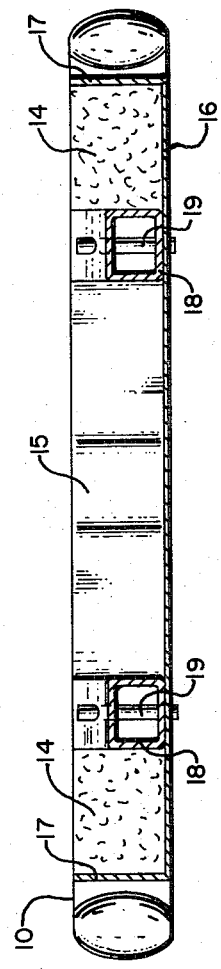
FIG. 3 is a partly sectional view of FIG. 1 taken along lines 3—3.

Referring now to FIGS. 1, 2, and 3, the first portion of the energy absorbing apparatus of the present invention which would contact a colliding object is bumper 10. Bumper 10 may be of any desired shape and made from any suitable rigid material such as metal, wood, reinforced plastic, or the like. Connected to bumper 10 are shock absorbers 12. The shock absorbers may be of any conventional type known in the art. The shock absorbers are preferably piston-type hydraulic shock absorbers. Various numbers of the shock absorbers may be used, and they may be located as desired. The shock absorbers 12 can be omitted, but their inclusion is preferred.

Shock absorbers 12 are also connected to load distribution member 11. Load distribution member 11 distributes point loads over large areas of the compressible energy absorbing material 13. The load distribution member 11 may be of any suitable configuration, but it is preferred that load distribution member 11 is generally shaped like a truncated "V", as indicated in FIG. 1. The truncated "V" configuration also helps to deflect the vehicle during collision with an object which contacts the vehicle along the angular side of member 11. Member 11 can be made of any suitable ductible metal or alloy. Bumper 10 could be omitted and load distribution member 11 could comprise the entire bumper, although it is preferred that bumper 10 be used in combination with member 11.

A compressible energy absorbing material 13 connects load distribution member 11 to vehicle frame 18 and to frame 15. Material 13 may be connected to member 11 and frame 18 by any means well known in the art, e.g., welding, bolting, force fitting, and the like. Material 13 prevents point loads from contacting frame 15. The compressible energy absorbing material 13 may suitably comprise any rigid cellular or honey-combed material which will collapse or crush under sufficiently heavy loads, i.e., a substance which is substantially non-elastic and non-resilient. Mechanically expanded metals may also be used. Such metals include "grating" or "fencing" which is formed by cutting intermittent, staggered slits in a metal sheet and then stretching the sheet laterally to open the slits. Foamed metals are preferred because they have substantially equal compressive strength in all directions. Examples of such compressible metals include foamed aluminum, foamed steel, foamed zinc, and the like.

Foamed metals are well known in the art (see U.S. Pat. Nos. 2,895,819; 3,300,296; and 3,297,431). In general, such foams are prepared by adding a gas-evolving compound to a molten metal, and heating the resultant mixture to decompose the gas-forming compound to prepare blowing gas. The gas causes the metal to foam by expansion. After blowing, the resultant body is cooled to produce a foamed solid. Such gas forming solid may be a metal hydride such as $TiH_2$, $ZrH_2$, or magnesium, aluminum, or lithium hydride (see U.S. Pat. No. 2,983,597). Particularly preferred is foamed aluminum and alloys thereof. The foamed aluminum alloy may suitably include such metals as copper, manganese, chromium, magnesium zinc, lead, nickel, and various other suitable metals.

Although not essential, the compressible energy absorbing material 14, as shown in FIG. 1, preferably has a higher density and correspondingly higher compressive strength that the compressible energy material 13, since the stress on material 14 will be much greater than the stress on material 13 during a collision. The higher density material 14 can be the same type of material as material 13, or it can be different. For example, materials 13 and 14 could both be foamed aluminum, or one could be foamed zinc and the other foamed aluminum. When foamed aluminum is employed, the density of the foamed aluminum 14 may range from about 25 to about 50 pcf (pounds per cubic foot), or more preferably, from about 26 to about 30 pcf. The lower density foamed aluminum 13 may range from about 10 to about 22 pcf, or more preferably, from about 15 to about 20 pcf.

Frame 15, as seen in FIG. 1, connects the two ends of frame 18. As indicated in the drawings, frame 15 is integrally formed with frame 18. However, any suitable means may be used to connect frame 15 to frame 18, e.g., welding, bolting, etc. Frame 15 is of the same general configuration as load distribution member 11, i.e., a truncated "V". Frame 15 may be made from any suitable ductile metal or alloy which will allow the member to bend without breaking. Frame 15 can be seen in FIGS. 1–3 to lie in a horizontal plane substantially parallel to that of frame 18. The "apex", or "truncated end" of frame 15 extends to the front end of the vehicle and the "legs" of frame 15 extend toward the rear of the vehicle.

As depicted in FIG. 2, tension member 16 is located beneath the energy absorbing apparatus. However, tension member 16 can be located above frame 18 and can comprise multiple tension members. Ends 17 of tension member 16 are perpendicular to member 16 and contain the higher density compressible material 14. Tension member 16 must not stretch or deform to an appreciable extent and should therefore be constructed of high strength metal or metal alloy, such as steel or the like. The ends of frame 18 expand outwardly as frame 15 collapses or straightens when bumper 10 collides with some object. Tension member 16 is held in place by ends 17 which are connected to compressible material 14 by welding or any other suitable means. Alternatively, tension member 16 can be held in place by shear pins 19, or other suitable means.

If desired, one or more additional frames similar to frame 15 could be connected to frame 18 behind frame 15. The space between frame 15 and the next frame would be filled with a compressible energy absorbing material such as material 13 or 14. A tension member similar to tension member 16 would be placed under or over the frame 18 at the point where the additional frame was connected to frame 18. The tension member would be filled with a compressible energy absorbing material in a manner similar to the manner in which tension member 16 was filled.

It is preferred that shear pins 19, as shown in FIGS. 1 and 3, extend through frame 18 and through tension member 16 to provide additional strength for the frame member 18 during normal operation of the vehicle. Shear pins 19 are designed to shear under relatively low stress. Cross member 22 connects frame members 18.

When bumper 10 collides with an object directly in front of the automobile, the shock absorbers 12 will compress, thereby absorbing some of the energy of the collision. If the collision occurs at a sufficiently high speed, the shock absorbers 12 will compress fully and bumper 10 will strike load distribution member 11. Load distribution member 11 will bend and compress the compressible material 13.

The compressible material 13 will exert force on frame 15 thereby causing shear pins 19 to shear. After shear pins 19 shear, frame 15 will bend toward the rear of the vehicle. As frame 15 begins to straighten as it bends toward the rear of the vehicle, the frame 18 will expand outwardly, thereby compressing material 14 against the ends 17 of tension member 16. Part of the collision energy is dissipated by the crushing of the compressible material 14, and part of the energy is dissipated by the crushing of compressible material 13. Additional energy is dissipated in bending load distribution member 11, frame 15, and frame 18. Generally speaking, member 11, frame 15, frame 18, and compressible materials 13 and 14 begin to deform at substantially the same time. However, the compressive strength of material 13 can be selected sufficiently small to allow much of material 13 to crush or deform prior to the beginning of the deformation or collapse of frame 15 or frame 18.

When bumper 10 collides with an object at an angle, one side of bumper 10 compresses the most proximately located shock absorbers 12. If the collision occurs at a sufficiently high speed, the shock absorbers will compress fully on the colliding side and will transmit the force to load distribution member 11. Load distribution member 11 will compress compressible material 13. Compressible material 13 will transmit a force to one side of frame 15 and cause it to start straightening or collapsing. The energy action of the collapsed frame 15 will occur similarly to that described in the front end collision.

Shock absorbers 12 may twist as bumper 10 deforms thereby providing no more energy absorption. Shock absorbers 12 are designed to shear away from load distribution member 11 so that member 11 will stay in relatively uniform contact with compressible energy absorbing means 13. Any conventional design may be employed to facilitate shearing, e.g., using low strength steel ends on the absorber, using low strength connecting bolts or pins, and the like.

A likely object of collision is a tree or telephone pole. The bumper means 10 and shock absorber 12 would provide little energy absorption unless struck directly. When the pole or tree is struck directly without shock absorber 12, load distribution member 11 will deform taking the shape of the object until the load is sufficiently spread through the compression means 13. Frame 15 would deform as previously described.

Preferably angle 20 is approximately the same as angle 21, although the angles may be different in size in a properly designed system. Angle 20, and angle 21, are dependent upon the desired maximum length of the vehicle beyond the front wheels, upon the compressive strength of compressible material 14, the relative lengths of frame member 15 and tension member 16, the stiffness of frame 18, and the distance between the end of frame 18 and cross-member 22. Generally speaking, angles 20 and 21 will range between about 100° to 170°. More preferably, angles 20 and 21 will range between about 140° to 160°.

In another embodiment of the present invention, a connecting bar (not shown) would connect both of the ends of vehicle frame 18. The connecting bar connecting frame 18 would elongate to the full extension of the frame without rupture. It could be of any suitable configuration. The connecting bar can be made of alloy steel or other means such as accordian-type bending members.

In still another embodiment of the present invention, the above-mentioned connecting bar would connect both ends of vehicle frame 18, but tension member 16 and compressible material 14 would be omitted. The remainder of the energy absorbing apparatus would be the same.

In a further embodiment, the tension member 16 and connecting bar may be omitted.

What is claimed is:

1. An energy absorbing apparatus for vehicles comprising:
   a. load distribution means,
   b. compressible foamed metal energy absorbing means connected to said load distribution means,
   c. first frame means connected to said energy absorbing means,
   d. tension member means connected to said compressible energy absorbing means, said tension member means being located adjacent said first frame means, said tension member means comprising a metal member means extending across said vehicle frame means and beneath said first frame means, and
   e. vehicle frame means connected to said first frame means.

2. The apparatus of claim 1 wherein said load distribution means comprises a member generally shaped like a truncated "V".

3. The apparatus of claim 1 wherein said compressible, energy absorbing means comprises mechanically expanded metal.

4. The apparatus of claim 1 wherein said compressible, energy absorbing means comprises foamed aluminum.

5. The apparatus of claim 1 wherein said load distribution means has bumper means connected thereto.

6. The apparatus of claim 5 wherein said bumper means is connected to said load distribution means by shock absorber means.

7. The apparatus of claim 1 wherein said first frame means comprises a member generally shaped like a truncated "V".

8. The apparatus of claim 1 wherein said tension member has ends which are perpendicular to said tension member, said ends being connected to said compressible energy absorbing means.

9. The apparatus of claim 1 wherein said tension member means is connected to said vehicle frame means and said frame means by shear pin means.

10. The apparatus of claim 1 wherein a connecting bar is connected to the ends of said vehicle frame.

11. The apparatus of claim 1 wherein said vehicle frame means has two front members which are connected by a connecting bar.

12. A method for decelerating a moving vehicle having a frame means comprising:
   a. applying a decelerating force to said vehicle, and
   b. transmitting said force through compressible energy absorbing means to first frame means causing said first frame means to bend, said bending of said first frame means moving said vehicle frame means outwardly, wherein said outwardly flexing frame means contacts compressible foamed metal energy absorbing means.

13. The method of claim 12 wherein said decelerating force is applied to load distribution means.

* * * * *